Patented Nov. 8, 1932

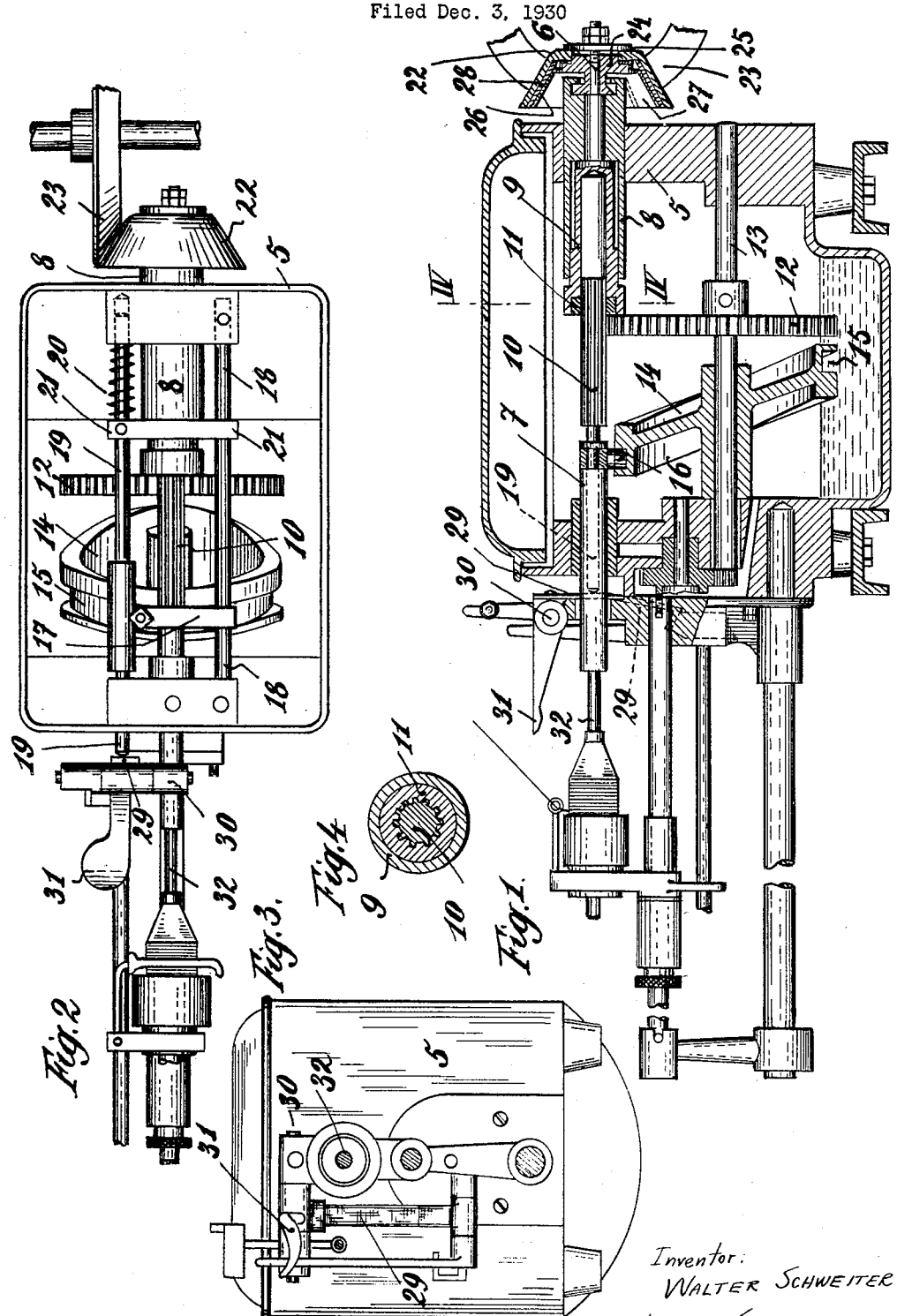

1,886,598

UNITED STATES PATENT OFFICE

WALTER SCHWEITER, OF HORGEN, NEAR ZURICH, SWITZERLAND

COP WINDING MACHINE

Application filed December 3, 1930, Serial No. 499,795, and in Germany January 28, 1930.

The invention relates to cop winding machines having a reciprocating winding spindle and in which a driving shaft driven by a friction disc is arranged coaxially with the winding spindle and forms a bearing for the latter, the driving shaft and the winding spindle being coupled with one another so that they can execute relative motions in an axial direction.

In cop winding machines of this class it is already known to entrain the winding spindle by freely movable balls which to this end engage grooves cut into the spindle shaft, while the transmission of the rotary motion to the cam disc is effected by a special gear. This comparatively complicated structure requires a great number of moving parts which easily wear out so that the exact operation of the machine is harmed.

It has been further proposed to make the friction disc-driven driving shaft integral with the winding spindle shaft and to loosely dispose on the latter a cam drum which is driven through the intermediary of a toothed gear, said cam drum having an internal eccentric groove engaged by a roller mounted on the spindle shaft, so that the latter reciprocates. This arrangement however, suffers from the drawback of the necessity of the cam drum to be driven by the aid of an intermediate gear, and of the friction disc and one of the wheels of the gear engaging by splines longitudinal grooves of the reciprocating spindle shaft, which splines and grooves easily wear out.

Now the object of the invention is so to simplify the gear, to save moving parts, to make in this way the whole arrangement more surveyable, and to prevent wear. With these objects in view the invention consists primarily in the fact that the end of the winding spindle forms a pinion which both is positively connected to the driving shaft so as to be entrained by it, and at the same time drives the cam disc shaft for the winding spindle. In this way first, in lieu of the indirect transmission of the rotary motion by interposed balls, a direct transmission is obtained by the extremity of the winding spindle forming a pinion, which is directly in mesh with a sleeve mounted on the driving shaft and carrying corresponding internal teeth. Furthermore, the winding spindle shaft end which forms a pinion simultaneously realizes another object in so far as it serves to drive the cam disc whereby the otherwise required intermediate members can be dispensed with.

In order to simplify also the starting device, according to the invention one of the two bars which carry the guiding slide for the winding spindle is movable in axial direction against the action of a spring and is connected with the shiftable bearing sleeve of the driving shaft. Furthermore, the free end of this bar abuts outside the gear case on the well-known starting lever, so that upon stopping the machine the shiftable bar together with the driving shaft, which carries the friction disc, is free to be thrown out by said spring. The friction disc itself which in known manner consists in a conical metal body with a leather cover slid thereon has disposed thereon an intermediate layer of rubber between the metal body and the cover, while the metal body is slotted, so that the friction disc is somewhat elastic whereby a satisfactory contact with the companion disc is obtained.

In order that the invention may be more readily understood, an embodiment of the same is illustrated by way of example in the accompanying drawing in which Figure 1 is a sectional view of the gear case and the other parts under consideration of a cop winding machine designed according to the invention, Figure 2 is the appurtenant top view and Figure 3 the appurtenant left end view, while Figure 4 is the section on line IV—IV of Figure 1.

Referring to this drawing, 5 denotes the gear case in which the driving shaft 6 and the winding spindle shaft 7 are mounted coaxially. Shaft 6 runs in a bearing sleeve 8 in which another sleeve 9 is arranged which is rigidly connected to shaft 6 and serves as a guide for the end of spindle shaft 7 which forms a pinion 10. Sleeve 8 is axially shiftable in the machine frame as described hereinafter. In the enlarged frontal portion of sleeve 9 is lodged a coupling member 11 which has a crown of internal teeth and establishes positive connection between the driving shaft 6 and the spindle shaft 7 in the direction of rotation, while both these shafts can shift relatively to one another in an axial direction.

The pinion 10 is in mesh with a gear wheel 12 mounted on an auxiliary shaft 13 which carries the cam disc 14. The cam groove 15 of disc 14 is engaged by a roller 16 mounted on the slide 17. This slide 17, mounted between collars of spindle shaft 7, is capable of imparting a reciprocating motion to the spindle shaft without affecting its rotary movement. The slide 17 is supported by two bars 18 and 19 the former of which is stationary while bar 19 can shift axially against the action of a spring 20 and is rigidly connected with the bearing sleeve 8 by a traverse 21. The latter rests on the bar 18 but is not in rigid connection therewith so that bar 18 serves as a guide for traverse 21.

The driving shaft 6 carries a conical friction disc, coated externally with a layer of leather 22, in mesh with a companion disc 23 and held in position by two clamp discs 24, 25. The first mentioned disc is fitted on its metal body 26 with a leather cover 22, the metal body having a longitudinal slot 27 so as to be somewhat elastic. Between the body 26 and the leather cover 22 there is a rubber layer 28, Figure 1, to obtain a certain elasticity by which the friction between the two friction discs is increased. Under circumstances the slot 27 in the body 26 may be dispensed with. The described mechanism is thrown in and out by axially shifting the driving shaft 6 by the aid of bar 19, the end of which, projecting beyond the left-hand side of the case, abuts on a notched lever 29. This lever is in connection with the starting lever 31 fulcrumed at 30, so that by turning the latter, bar 19 and therewith sleeve 8 rigidly connected thereto and shaft 6 are shifted against the action of spring 20. In this way the starting can be effected quite gradually, so that the winding spindle starts running slowly.

The spindle 32 is conencted with the shaft 7 in the usual way; the yarn guide may be of any usual design.

As will be seen, the described gear is much simpler and more easily accessible and surveyable when compared with the hitherto known designs. Furthermore, as several revolving and shifting parts are dispensed with, not only the wear of the mechanism but also the power required is reduced in comparison with known mechanisms of this class.

What is claimed is:—

1. In the combination of a cop winding machine having a rotating and reciprocating spindle comprising a spindle shaft terminating in a pinion, a drive shaft for said spndle shaft coaxial therewith, a bearing for said spindle shaft formed in said drive shaft, coupling means between said drive shaft and spindle shaft for simultaneously allowing relative longitudinal motion between said shafts and enforcing the rotational movement of the drive shaft upon the spindle shaft, an auxiliary shaft adjacent said drive and spindle shafts, a gear mounted on said shaft engaging said pinion, and a cam also mounted on said shaft for reciprocating said spindle.

2. In the combination of a cop winding machine having a rotating and reciprocating spindle comprising a spindle shaft terminating in a pinion, a drive shaft for said spindle shaft coaxial therewith, a bearing for said spindle shaft formed in said drive shaft, comprising a sleeve having a longitudinal bore rigidly connected with said drive shaft, an internally toothed member in said sleeve engaging said pinion, said internally toothed member and pinion forming a coupling means between said drive shaft and spindle shaft for simultaneously allowing relative longitudinal motion between said shafts and enforcing the rotational movement of the drive shaft upon the spindle shaft, an auxiliary shaft adjacent said drive and spindle shafts a gear mounted on said last mentioned shaft engaging said pinion, and a cam also mounted on said shaft for reciprocating said spindle.

3. In the combination of a cop winding machine having a rotating and reciprocating spindle comprising a spindle shaft terminating in a pinion, a drive shaft for said spindle shaft coaxial therewith, a frictional coupling member connected at one end of said shaft, a transmission element cooperating with said member, an axially shiftable sleeve carrying said drive shaft and coupling member, a bearing for said spindle shaft formed in the other end of said drive shaft, coupling means between said drive shaft and spindle shaft for simultaneously allowing relative longitudinal motion between said shafts and enforcing the rotational movement of the drive shaft upon the spindle shaft, an auxiliary shaft adjacent said drive and spindle shafts, a gear mounted on said shaft engaging said pinion, a cam also mounted on said shaft for reciprocating said spindle, a roller member engaging said cam, a slide carrying said roller member loosely mounted upon said spindle shaft, guiding means for said slide comprising a longitudinal bar connected to said axially shiftable sleeve, resilient means cooperating with said bar for normally retaining said sleeve and frictional coupling member carried thereby out of operative engagement with said transmission element, and manipulative means cooperating with said bar for longitudinally shifting said bar, sleeve, and coupling member into operative position.

4. In the combination of a cop winding machine having a rotating and reciprocating spindle comprising a spindle shaft terminating in a pinion, a drive shaft for said spindle shaft coaxial therewith, a frictional coupling member connected at one end of said shaft, a transmission element cooperating with said member, an axially shiftable sleeve carrying said drive shaft and coupling member, a bearing for said spindle shaft formed in the other end of said drive shaft, coupling means between said drive shaft and spindle shaft for simultaneously allowing relative longitudinal motion between said shafts and enforcing the rotational movement of the drive shaft upon the spindle shafts, an auxiliary shaft adjacent said drive and spindle shafts, a gear mounted on said shaft engaging said pinion, a cam also mounted on said shaft for reciprocating said spindle, a roller member engaging said cam, a slide carrying said roller member loosely mounted upon said spindle shaft, guiding means for said slide comprising a fixed bar extending longitudinally of the machine frame cooperating with one end of said slide, a second bar extending longitudinally of the machine frame and capable of an axial shifting movement, cooperating with the other end of said slide, a traverse fixed to said second bar and slidable along said first bar, said traverse being fixed to said sleeve, resilient means cooperating with said second bar and traverse for normally retaining said sleeve and frictional coupling member carried thereby out of operative engagement with said transmision element, and a manipulative lever for shifting said second bar, with said traverse and sleeve connected therewith, to engage said coupling member for operation.

The foregoing specification signed at Zurich, Switzerland this 22nd day of November, 1930.

WALTER SCHWEITER.